United States Patent [19]
Aldred et al.

[11] Patent Number: 5,197,267
[45] Date of Patent: Mar. 30, 1993

[54] GRASS CUTTING UNIT

[75] Inventors: Edward J. Aldred; Graham E. Gaskin, both of Suffolk, Great Britain

[73] Assignee: Ransomes, Sims & Jefferies Limited, Suffolk, England

[21] Appl. No.: 479,673

[22] Filed: Feb. 9, 1990

[30] Foreign Application Priority Data

Feb. 9, 1989 [GB] United Kingdom ............... 8902933

[51] Int. Cl.$^5$ ............................................. A01D 34/62
[52] U.S. Cl. ........................................ 56/249; 56/17.1; 56/251
[58] Field of Search ................... 56/17.1, 17.2, 249, 56/249.1, 251, 252, 253, 294

[56] References Cited

U.S. PATENT DOCUMENTS

| | | | |
|---|---|---|---|
| 1,538,381 | 5/1925 | Bull | 56/251 |
| 1,607,382 | 11/1926 | Zakrzewsky | 56/238 |
| 2,476,084 | 7/1949 | Cour | 56/249 |
| 2,483,846 | 10/1949 | Roche et al. | 56/249 |
| 2,782,586 | 2/1957 | Specht | 56/238 |
| 3,638,405 | 2/1972 | Ferguson | 56/10.4 |
| 3,693,333 | 9/1972 | Bishop | 56/16.1 |
| 4,345,419 | 8/1982 | Chandler | 56/294 X |
| 4,494,365 | 1/1985 | Lloyd | 56/256 |
| 4,878,340 | 11/1989 | Roy et al. | 56/249 |
| 4,947,630 | 8/1990 | Rich et al. | 56/249 |

FOREIGN PATENT DOCUMENTS

| | | |
|---|---|---|
| 2543305 | 7/1977 | Fed. Rep. of Germany . |
| 11873 | of 1911 | United Kingdom . |
| 433255 | 8/1935 | United Kingdom . |
| 536910 | 5/1941 | United Kingdom . |
| 605134 | 7/1948 | United Kingdom . |
| 627649 | 8/1949 | United Kingdom . |
| 1098727 | 1/1968 | United Kingdom . |
| 1518471 | 7/1978 | United Kingdom . |
| 2115666 | 9/1983 | United Kingdom . |

*Primary Examiner*—Ramon S. Britts
*Assistant Examiner*—David J. Bagnell
*Attorney, Agent, or Firm*—Browdy and Neimark

[57] ABSTRACT

A grass cutting unit with a conventional cutter reel has forward and rear rollers mounted on a common, pivotable, carriage. By adjustable pivoting of this carriage the height of cut can be adjusted while maintaining strict parallelism between the rollers. A knife or groomer roller is cantilevered in front of the forward roller and is supported on the common roller carriage.

10 Claims, 4 Drawing Sheets

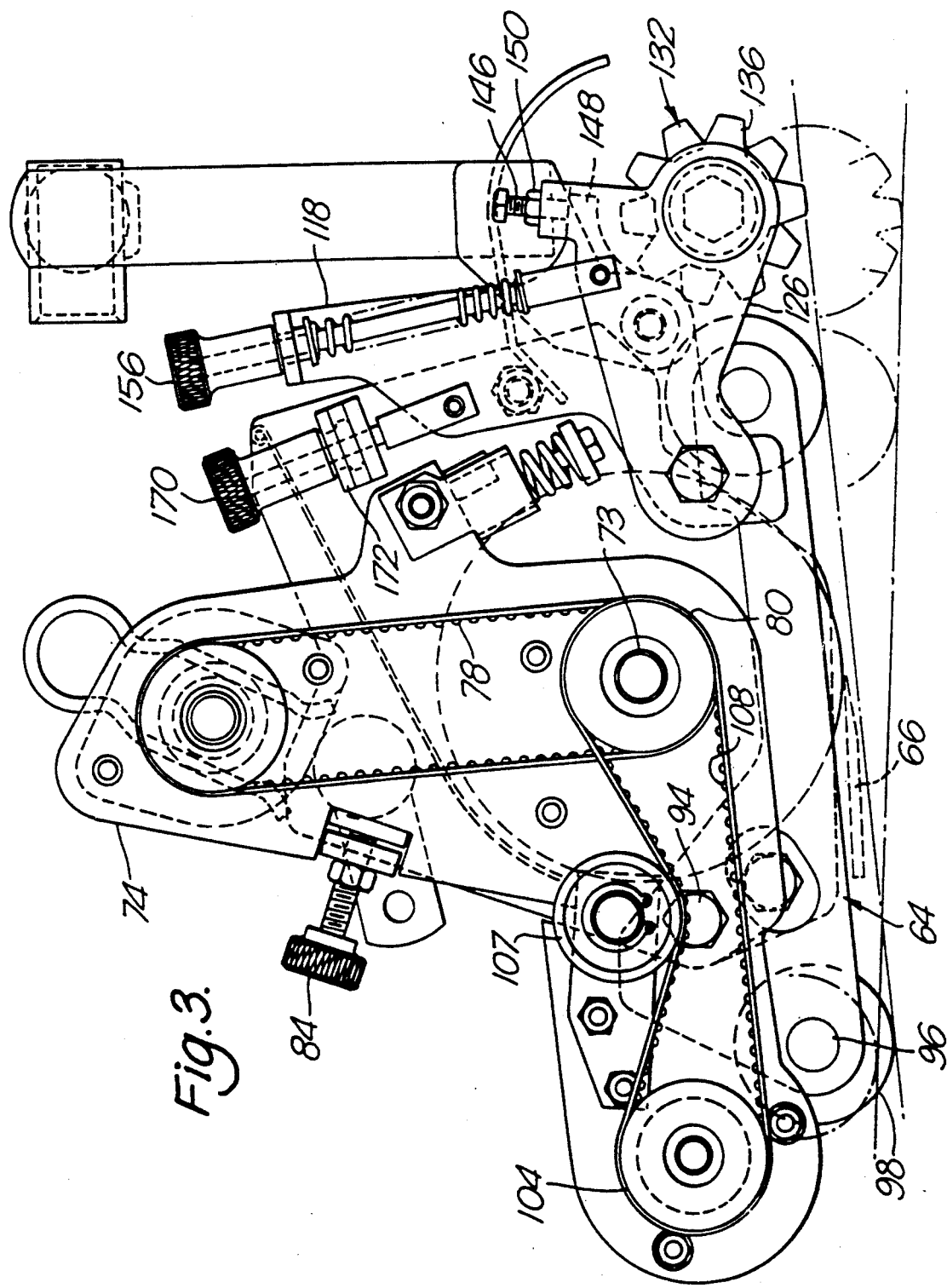

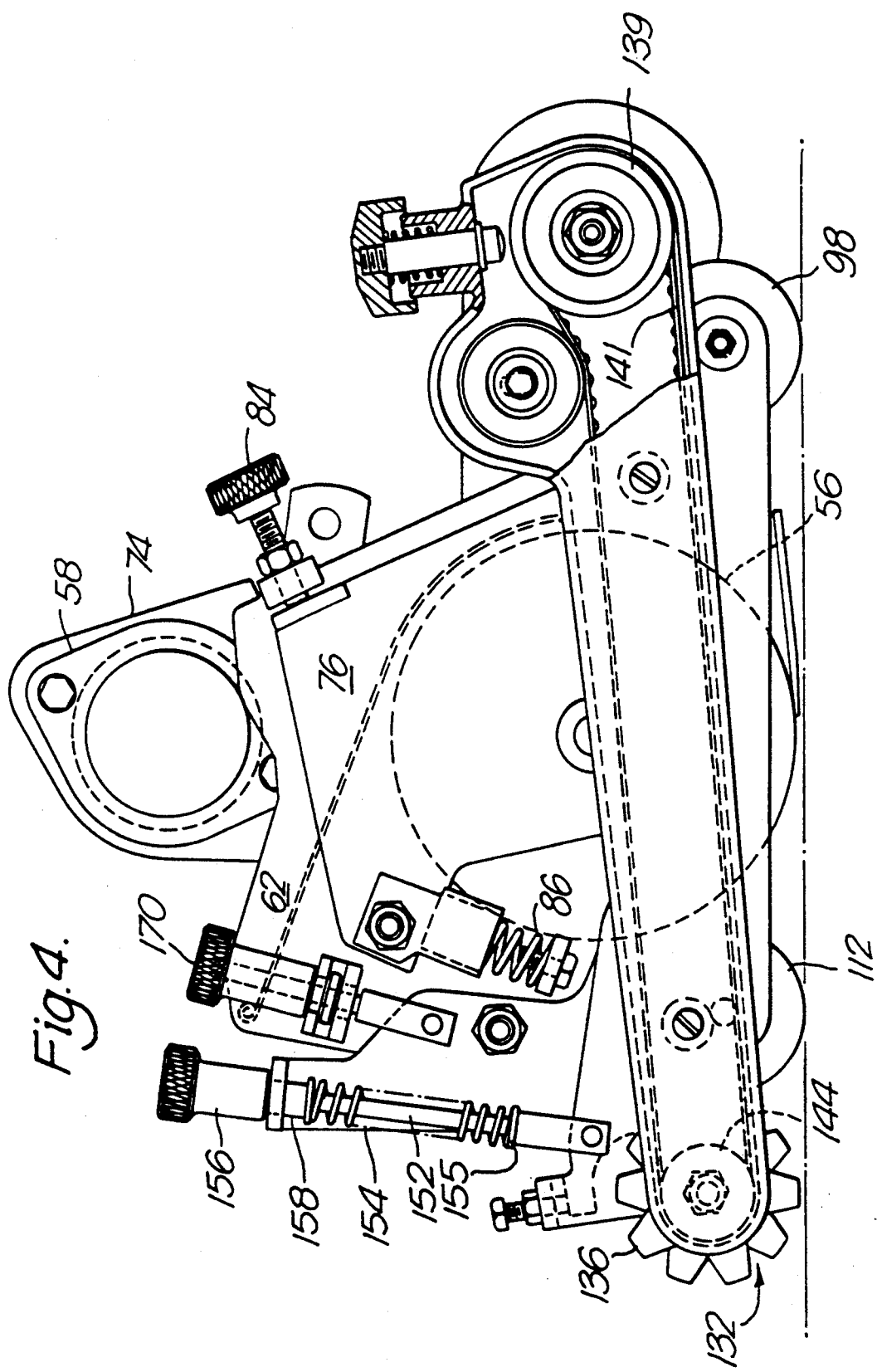

GRASS CUTTING UNIT

This invention relates to a cutting unit for grass cutting machines.

One conventional form of grass cutting unit comprises a frame supporting a cutting reel which is driven about a reel axis. A bed knife is supported on the frame and positioned to cooperate with the spiral blades of the cutting reel. Front and rear rollers are supported on the frame and extend parallel to the transverse cutting edge of the bed knife, and a means of altering the vertical position of these rollers is provided to adjust the height of cut of the unit. Generally, the front roller is adjusted upward or downward at each end until a constant height of cut is achieved across the width of the machine. Unless, however, the rear roller is maintained parallel with the front roller, optimum cutting performance cannot be achieved. Means are accordingly provided in some machines to alter the vertical position at each end of the rear roller, to achieve parallelism. This is, however, a difficult and tedious adjustment to make and, even with the use of gauges, accuracy cannot be guaranteed.

GB-A-605,134 discloses a roller driven lawn mower having a cutter reel mounted in front of a drive roller. Two smaller rollers are mounted on pivotal cradles, one roller lying between the cutter reel and the drive roller, the other behind the drive roller. The pivotal attachment of the cradles allows adjustment of the height of cut. The fact that there are no rollers in front of the cutter reel is stated to have the advantages of avoiding the flattening of grass before cutting and enabling grass to be cut close to obstacles. Such an arrangement is not, however, suitable for current grass cutting units which employ power driven cutter reels and have no drive roller. Moreover, the presence of a roller in front of the cutter reel, contrary to the proposal in this prior art, is believed to be important if the cutter reel is to follow ground contours accurately.

GB-A-627,649 discloses a lawn mower having a frame supported on front and rear rollers with a handle enabling the frame to be pushed over the grass. Within the frame, there is positioned a cutting unit including a cutting rotor and a drive motor. This cutting unit can be pivotted relatively to the frame to adjust the height of cut. Such an arrangement is not suitable for use with a grass cutting machine where one or more cutting units are mounted on a riden machine so as to follow ground contours.

In certain known cutting units, the front roller is grooved to enable it to penetrate the turf more easily. This has been found to improve cutting performance. It has further been proposed, particularly for high quality turf such as golf greens, to add behind the front roller a cutting roller or groomer. This has a number of vertically disposed blades which are interleaved with the grooves of the front roller, and serve to cut horizontally growing grass blades and other plant matter at the soil line, such matter being collectively referred to as thatch. Reference is directed in this connection to U.S. Pat. No. 4,494,365. It is there explained that the grooved front roller causes a lifting or puckering up of the thatch material into the grooves of the roller, enabling the blades of the knife roller to lift and slide through the lifted thatch. It is a difficulty with the provision of a knife roller as suggested in U.S. Pat. No. 4,494,365, that the separation of the front and rear rollers is necessarily greater than in a conventional unit. This increases the risk of scalping by the reel on undulating turf.

It is proposed in U.S. Pat. No. 3,693,333 to provide a knife roller in front of the forward roller. Here, though, the knife roller is supported on castors and is spaced sufficiently in front of the forward roller to accomodate a grass box between the two. Such an arrangement is cumbersome and expensive and may interfere with close manoeuvring of the machine.

It is an object of one aspect of this invention to provide an improved cutting unit in which parallelism of the front and rear rollers can more accurately be controlled.

It is an object of another aspect of this invention to provide an improved cutting unit in which a knife roller can be provided for cutting thatch, without any substantial increase in the risk of scalping by the reel on undulating turf.

Accordingly, the present invention consists in one aspect in a grass cutting unit for a powered and riden grass cutting machine, the unit comprising a frame adapted to be supported on the machine for movement relative thereto in following ground contours; a cutter reel mounted in the frame for driven rotation; a bed knife supported on the frame and having a transverse cutting edge for cooperation with the cutter reel and front and rear rollers disposed respectively in front of and behind the cutter reel, characterised in that there is provided a roller carriage mounted on the frame for pivotal movement relative to the bed knife about a transverse axis, said front and rear rollers being each supported on the carriage for pivotal movement therewith and there being provided adjustment means adapted through pivotal movement of the roller carriage relative to the frame to adjust the height of cut of the cutting unit whilst retaining parallelism between the front and rear rollers.

Advantageously, the carriage comprises a pair of roller support arms pivotable about a common transverse axis relative to the bed knife, the front roller being supported between corresponding front ends of the support arms and the rear roller between corresponding rear ends of the support arms.

Suitably, the adjustment means comprises a pair of adjustors acting respectively on the pair of support arms.

Preferably, a support means is mounted on the carriage for pivotal movement relative thereto about a transverse axis, said support means rotationally supporting a knife roller which extends in front of and parallel with the front roller, the knife roller providing a plurality of axially spaced, vertically extending thatch cutting blades.

In another aspect, the present invention consists in a grass cutting unit for a powered and riden grass cutting machine, the unit comprising a frame adapted to be supported on the machine for movement relative thereto in following ground contours; a cutter reel mounted in the frame for driven rotation; a bed knife supported on the frame and having a transverse cutting edge for cooperation with the cutter reel; front and rear rollers extending transversely and disposed respectively in front of and behind a cutter reel and a knife roller extending parallel with the front roller and providing a plurality of axially spaced, vertically extending thatch cutting blades, characterised in that knife roller support means are provided for cantilever support of the knife roller immediately in front of the front roller.

This invention will now be described by way of example with reference to the accompanying drawings in which:

FIG. 3 is a right hand side view of the cutting unit shown in FIG. 2; and

FIG. 4 is a left hand side view of the cutting unit shown in FIG. 2.

Figure 1:
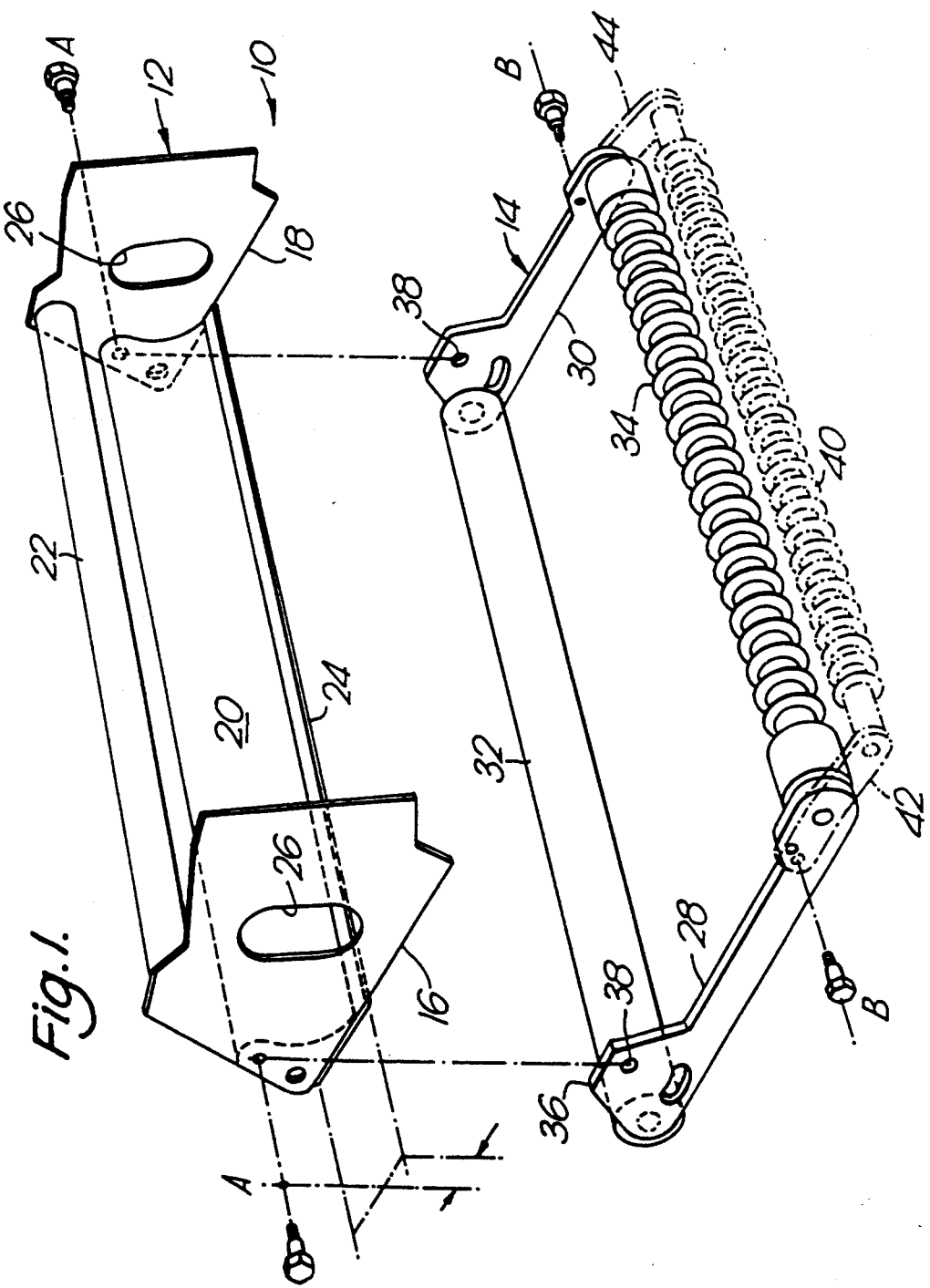
FIG. 1 is a diagrammatic exploded view of a cutting unit according to this invention.

Referring initially to FIG. 1, the cutting unit shown generally at 10 comprises a frame assembly 12 and a roller carriage 14. The frame assembly comprises parallel side plates 16 and 18 bolted at opposite ends of a bottom block 20. This bottom block supports a bed knife 22 and has threaded bores 23 aligned on transverse axis AA for mounting of the roller carriage, as will be described. The side plates 16 and 18 are further interconnected through tie rod 24. A conventional cutting reel (not shown in FIG. 1) is mounted on bearings which are accommodated in the apertures 26 provided in the respective side plates 16 and 18. The cutting reel is typically supported in an external frame providing for adjustable movement of the cutting reel relative to the frame assembly 12 and thus the bed knife 22. The oversize nature of the apertures 26 accommodates this movement.

The roller carriage 14 comprises side arms 28 and 30 between which extend a rear roller 32 and a grooved front roller 34. Integral flanges 36 are provided on each of the side arms 28 and 30 and have aligned apertures 38 enabling the roller carriage to be mounted on the frame assembly through bolts 39 for pivotal movement about axis AA.

Provided that accurate control is maintained in manufacture over the orientation of axis AA relative to the plane of the bed knife and the orientation in the roller carriage side arms of the pivot and roller axes, parallelism is assured between the two rollers and the bed knife at any required height of cut. Control is maintained over the orientation of the cutter reel relative to the bed knife by the described adjustment of the illustrated frame assembly with respect to the external frame supporting the cutter reel. Means (not shown in FIG. 1) are provided to adjust the height of cut through pivotal movement of the roller carriage relative to the frame assembly. During this movement it will be observed that parallelism is always retained when a uniform height of cut is achieved.

It is known that the provision of a knife roller or groomer having a plurality of axially spaced, vertically extending cutting blades can be effective in cutting through the thatch which can otherwise be a problem on highly cultivated turf areas such as golf greens. In a preferred form of this invention, a knife roller is provided forwardly of the front roller. To avoid the thatch cutting blades digging into or leaving the ground it has hitherto been the practice to position such a knife roller behind the front roller or, in the case of U.S. Pat. No. 3,693,333, to mount the knife roller on castors. It has unexpectedly been found by the present applicants that a knife roller can operate satisfactorily when cantilevered forwardly of a front roller.

Referring still to FIG. 1, there is shown in dotted outline a knife or groomer roller 40 which is in itself of generally conventional construction. That is to say it comprises a plurality of vertically disposed cutting discs 41 mounted on a shaft and interleaved with axial spacers. Each cutting disc is shaped to provide a number of thatch cutting blades. The knife roller 40 extends between two roller arms 42 and 44. These are in turn mounted on the roller carriage 14 through bolts 46 for pivotal movement about a pivot axis BB which lies behind the front roller axis. Means (not shown in FIG. 1) are provided for adjusting the position of the knife roller 40 relative to the roller carriage 14 through pivoting movement of the roller arms 42 and 44 about axis BB. In this way, the working position of the knife roller can be adjusted and the knife roller can be moved into and out of its working position.

It will be recognised that as the knife roller is positioned forwardly of the front roller, no increase is necessitated in the spacing between front and rear rollers. There is accordingly no greater risk of scalping on undulating turf. Since the knife roller is carried on the roller carriage, adjustments in the height of cut can be made without affecting the pre-set orientation of the knife roller relative to the front roller. In contrast with certain prior art arrangements, the blades of the knife roller do not project into the grooves of the front roller. There is accordingly no risk of damage or injury through contact between the blades and solid objects trapped within the grooves. The cantilevered form of support is simple and economic in manufacture, and it is found that, the close positioning of a knife roller does not interfere with delivery of cuttings to a forward grass box.

Figure 2:
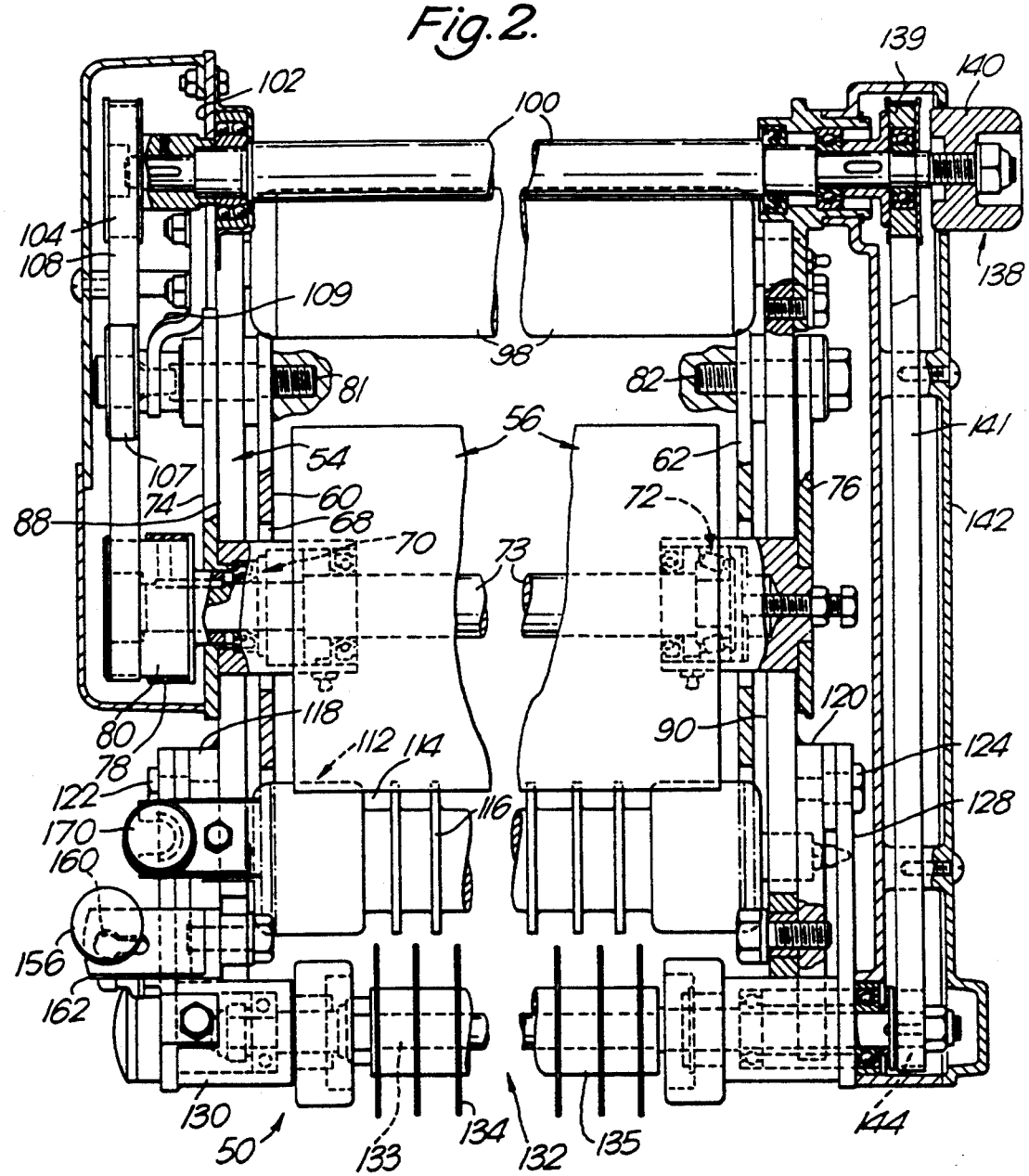
FIG. 2 is a plan view in part section of a cutting unit according to a further embodiment of this invention.

A particular embodiment of this invention will now be described in further detail with reference to FIGS. 2 to 4.

The cutting unit shown generally at 50 has a frame assembly 52 which supports a roller carriage 54, a cutter reel 56 and a hydraulic drive motor 58.

The frame assembly 52 comprises a pair of inner side plates 60 and 62 which extend in parallel on opposite sides of the cutter reel 56. These side plates together support a cuttings deflector 61. A bottom block 64 extends between the inner side plates and carries a bed knife 66. The two inner side plates 60 and 62 are secured to opposite ends of the bottom block 64 through bolts 81 and 82, and other bolts, not shown, which prevent relative movement between the inner side plates and the bottom block.

Opposed apertures 68 are provided in the inner side plates 60 and 62, these apertures accommodating with clearance the bearings 70 and 72 at opposite ends of the cutter reel shaft 73. These bearings are mounted respectively in outer side plates 74 and 76 which extend in parallel spaced relationship to the respective inner side plates 60 and 62. The outer side plates 74 and 76 are mounted on the bolts 81 and 82 for pivotal movement relative to the bottom block 64. The position of the bolt holes provided in the bottom block 64 to receive the pivot bolts 81 and 82 is controlled very accurately during manufacture to ensure parallelism between the axis AA of the pivot bolts and the bed knife 66 in the bottom block.

The right hand outer side plate 74 extends upward to provide a mounting for the hydraulic drive motor 58, with a toothed drive belt 78 extending from a pulley 59 on the motor drive shaft 61 to a double width pulley 80 on the cutter reel shaft 73.

Cylinder/blade adjustors 84 are provided to enable rocking adjustment of the outer side plates 74 and 76 relative to the inner side plates 60 and 62 about axis AA. This is to enable the position of the cutter reel to be adjusted relative to the bed knife. Referring to FIGS. 3 and 4, each adjustor 84 comprises a thumbwheel 85 on a stud 86 in screw threaded engagement with a block 87 provided (in this case) on inner side plate 62. The thumbwheel stud 86 engages an abutment 89 provided (in this case) on outer side plate 76 and a conventional lock nut 91 is provided. The cylinder/blade adjustors 84 act in cooperation with biassing springs 93 again acting between anchorages 95 in the inner side plates and anchorages 97 on the outer side plates. It will be recognized that the periphery of a cutter reel will not necessarily be or remain truly cylindrical so that separate adjustment of the outer side plates may be required to provide proper blade to bed knife contact across the width of the machine.

The pivot bolts 81 and 82 serve the additional function of providing a pivotal mounting for the roller carriage 54 relative to the frame assembly 52. As seen best in FIG. 2, the roller carriage 54 comprises right and left hand side arms 88 and 90 respectively. Each side arm comprises an integral upstanding flange 92 which lies between the corresponding inner and outer side plates and has an aperture 94 through which the corresponding pivot bolt 81,82 passes. Rearwardly of the pivot axis AA, defined by these pivot bolts 81 and 82, the two roller carriage side arms 88 and 90 are provided with respective apertures 96 serving to receive the ends of the rear roller 98. A brush roller 100 is mounted behind and slightly above the rear roller and is supported on extension pieces 102 extending rearwardly from the corresponding roller carriage side arms. The purpose of the brush roller 100 is to remove compacted grass blades and other debris from the rear roller. At its right hand end, the brush roller 100 carries a pulley 104 which is inter-connected through toothed belt 108 with the double width pulley 80 on the cutter reel shaft 73. Idler pulley 107 carried on a cranked support arm 109 extending from the right hand extension piece 102, maintains the correct tension in belt 108.

At their forward ends, the roller carriage side arms 88 and 90 are provided with apertures 110 which receive corresponding ends of the front roller 112. Over a central portion, the front roller is formed with a plurality of relatively wide grooves 114 separated by relatively narrow lands 116.

Right and left hand crank pieces 118 and 120 extend forwardly and upwardly from the respective roller carriage side arms 88 and 90. Each crank piece forms a mounting for a respective pivot bolt 122,124. These pivot bolts are aligned on pivot axis BB and provide respective pivotal mountings for groomer unit side arms 126 and 128 respectively. Forwardly of the front roller 112, each groomer unit side arm carries a respective bearing assembly 130, with a knife roller or groomer 132 extending between these bearing assemblies. The knife roller 132 comprises a shaft 133 on which are keyed knife discs 134 separated by spacers 135. As seen best in FIG. 4, each knife disc 134 provides a number of thatch cutting blades 136.

The left hand end of brush roller 100 carries a clutch assembly 138 enabling a subsidiary drive pulley 139 to be connected or disconnected from the driven brush roller through the action of clutch handwheel 140. A toothed drive belt 141 extends within belt casing 142 between the drive pulley 139 and a drive pulley 144 mounted at the left hand end of the knife roller shaft 133.

The position of the roller carriage 54 relative to the frame assembly can be adjusted through height of cut adjustors 168, provided one at each side. Each adjustor 168 comprises a collar 170 held captive relative to the corresponding inner side plate 60,62 by means of a flange 172. An adjuster rod 174 is screw threaded at one end within the collar 170 and engages at the opposite end the corresponding crank piece 118 through link 119. Rotation of the collars 170 accordingly serves to rock the roller carriage 54, via the integral crank pieces 118, 120 about pivot axis AA, thus lifting or lowering each end of the front roller 112 relative to the bed knife 66. By, for example, the use of a setting gauge, the front roller is adjusted until the required height of cut is achieved evenly across the width of the cutter reel. Through the action of the roller carriage side arms 88 and 90, the rear roller 98 is maintained in parallelism and no further manual adjustment is required.

Each groomer unit side arm 126,128 carries a screw thread adjuster 146 which engages a corresponding tongue 148 on the crank-pieces 118 and 120 to provide a downward stop for the groomer unit. Operation of each screw thread adjuster against locking nut 150 enables the working position of the groomer unit to be pre-set. The groomer unit is held in its working position by means of latched biassing assemblies 152. Each assembly comprises a rod 154 which is pivotedly connected at its lower end with the groomer side arm 126, 128. A screw threaded collar 156 is carried on the opposite end of the rod and has a neck portion 158 which cooperates with a keyhole slot 160 (seen in FIG. 2) formed in an outwardly bent extension 162 of the right hand crank piece 118. A compression spring 164 is carried on the rod 154, resting on shoulder 155. In the position shown in the drawings, the compression spring loosely engages the underside of neck portion 158. In this normal working position, the groomer unit is prevented from dropping by the action of screw thread adjuster 146 but is able to rise (for example to overcome an obstruction) with the spring 164 being compressed in any such upward movement between the shoulder 155 and the extension piece 162. This spring energy serves to return the groomer unit to work. If, under particular turf conditions, the groomer unit is not required, collar 156 can be lifted manually and, by a movement inwards, the neck portion 158 engaged with the narrow region of the keyhole slot 160 so that the groomer unit is maintained in the lifted position. Drive to the groomer unit can in this position be disconnected by operation of the clutch hand wheel 140.

It should be understood that this invention has been described by way of examples only and a variety of modifications are possible without departing from the scope of the invention. It is considered that the mounting of both rear and front rollers on a common carriage which is in turn mounted on the frame of the cutter unit for pivotal movement about an axis parallel to the rollers, has important advantages irrespective of whether a groomer unit is provided. The cantilever support of a groomer or knife roller forwardly of the front roller is similarly believed to have important advantages and, whilst the mounting of a groomer unit on a common roller carriage is preferred, there exists the alternative of mounting the groomer unit on a more conventional front roller assembly which is adjustable in position separately from the rear roller.

We claim:

1. A grass cutting unit for a powered and riden grass cutting machine, the unit comprising a frame adapted to be supported on the machine for movement relative thereto in following ground contours; a cutter reel mounted in the frame for driven rotation; a bed knife supported on the frame and having a transverse cutting edge for cooperation with the cutter reel; and front and rear rollers disposed respectively in front of and behind the cutter reel, characterised in that there is provided a roller carriage mounted on the frame for pivotal movement relative to the bed knife about a transverse axis, said front and rear rollers being each supported on the carriage for pivotal movement therewith and there being provided adjustment means adapted through pivotal movement of the roller carriage relative to the frame to adjust the height of cut of the cutting unit whilst retaining parallelism between the front and rear rollers.

2. A cutting unit according to claim 1, wherein the roller carriage comprises a pair of roller support arms pivotable about a common transverse axis relative to the bed knife, the front roller being supported between corresponding front ends of the support arms and the rear roller between corresponding rear ends of the support arms.

3. A cutting unit according to claim 2, wherein said adjustment means comprises a pair of adjustors acting on the respective support arms.

4. A cutting unit according to claim 3, wherein said adjustor comprises a screw thread adjustor connected between the frame and the corresponding support arm.

5. A cutting unit according to claim 1, wherein said transverse pivot axis is located between the axes of the rear roller and cutter reel respectively.

6. A cutting unit according to claim 1, wherein knife roller support means is mounted on the roller carriage for cantilever support of a knife roller extending in front of and parallel with the front roller, the knife roller providing a plurality of axially spaced, vertically extending, thatch cutting blades.

7. A cutting unit according to claim 6, wherein said knife roller support means is mounted on the carriage for pivotal movement relative thereto about a transverse axis extending parallel with and behind the front roller.

8. A grass cutting unit for a powered and riden grass cutting machine, the unit comprising a frame adapted to be supported on the machine for movement relative thereto in following ground contours; a cutter reel mounted in the frame for driven rotation; a bed knife supported on the frame and having a transverse cutting edge for cooperation with the cutter reel; front and rear rollers extending transversely and disposed respectively in front of and behind the cutter reel; a pair of cantilevered knife roller support arms; and a knife roller supported between said knife roller support arms extending parallel with and immediately in front of the front roller and providing a plurality of axially spaced, vertically extending thatch cutting blades.

9. A cutting unit according to claim 8, wherein said knife roller support means are pivotally mounted for rotation about a common transverse axis extending parallel to and behind the front roller.

10. A cutting unit according to claim 9, wherein adjustable stop means are provided for holding said knife roller support arms in an adjusted working position.

* * * * *